US009131467B2

(12) United States Patent
Li et al.

(10) Patent No.: US 9,131,467 B2
(45) Date of Patent: Sep. 8, 2015

(54) METHOD FOR TRIGGERING COMMUNICATION BETWEEN GROUP OF MTC DEVICES AND MTC SERVER, AND MTC DEVICE

(71) Applicant: HUAWEI DEVICE CO., LTD., Shenzhen (CN)

(72) Inventors: Xiaojuan Li, Beijing (CN); Shuiping Long, Beijing (CN); Hui Jin, Beijing (CN); Xiaoyan Duan, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 386 days.

(21) Appl. No.: 13/665,067

(22) Filed: Oct. 31, 2012

(65) Prior Publication Data
US 2013/0053087 A1 Feb. 28, 2013

Related U.S. Application Data

(63) Continuation of application No. PCT/CN2011/073350, filed on Apr. 27, 2011.

(30) Foreign Application Priority Data

Apr. 30, 2010 (CN) .......................... 2010 1 0168694

(51) Int. Cl.
 *H04B 7/00* (2006.01)
 *H04W 76/00* (2009.01)
 (Continued)

(52) U.S. Cl.
 CPC ............ *H04W 76/002* (2013.01); *H04W 4/005* (2013.01); *H04W 4/06* (2013.01); *H04W 4/08* (2013.01)

(58) Field of Classification Search
 USPC ......... 455/517–520, 553.1, 90.2, 78, 79, 500, 455/426.1, 412.1, 414.1, 416, 420; 370/352, 389, 338, 328
 See application file for complete search history.

(56) References Cited

U.S. PATENT DOCUMENTS

2011/0161503 A1 6/2011 Krebs
2012/0030358 A1* 2/2012 MacKenzie ................... 709/226
2012/0106391 A1 5/2012 Van Loon et al.

FOREIGN PATENT DOCUMENTS

CN 101651857 2/2010
CN 101977416 2/2011
(Continued)

OTHER PUBLICATIONS

International Search Report of PCT/CN2011/073350 mailed Jul. 21, 2011.
(Continued)

*Primary Examiner* — Dominic E Rego
(74) *Attorney, Agent, or Firm* — Staas & Halsey LLP

(57) ABSTRACT

The present invention discloses a method for triggering communication between a group of MTC devices and an MTC server, and an MTC device. The method includes: receiving an MTC request message sent by a machine type communications MTC server, where the MTC request message carries a group ID of the group of MTC devices and a communication notification message for the group of MTC devices; obtaining area information of the group of MTC devices; and sending the area information, the group ID of the group of MTC devices, and the communication notification message for the group of MTC devices to a cell broadcast center CBC, so that the CBC sends a broadcast message to a device in an area, where the broadcast message includes the group ID of the group of MTC devices and the communication notification message for the group of MTC devices.

16 Claims, 11 Drawing Sheets

(51) Int. Cl.
  *H04W 4/00*  (2009.01)
  *H04W 4/06*  (2009.01)
  *H04W 4/08*  (2009.01)

(56) References Cited

FOREIGN PATENT DOCUMENTS

| WO | 2010/017913 | 2/2010 |
|---|---|---|
| WO | 2011/006768 | 1/2011 |

OTHER PUBLICATIONS

*3rd Generation Partnership Project; Technical Specification Group Services and System Aspects; System Improvements for Machine-Type Communications; (Release 10)*, 3GPP TR 23.888 V0.3.2, Mar. 2010, pp. 1-33.
International Search Report, dated Jul. 21, 2011, in corresponding International Application No. PCT/CN2011/073350 (3 pp.).
Written Opinion of the International Searching Authority, dated Jul. 21, 2011, in corresponding International Application No. PCT/CN2011/073350 (5 pp.).
"Key Issue-Location Specific Trigger", KPN, Sierra Wireless, Jan. 20, 2010, 3GPP TSG SA WG2 Meeting #77.
"7.2.15 Removal of Editors Note on Location Specific Trigger", KPN, Feb. 26, 2010, 3GPP TSG-SA1 #49.
"Network Improvement for MTC Device Trigger", Huawei, Feb. 26, 2010, 3GPP TSG SA WG2 Meeting #78.
"Addressing for NIMTC", InterDigital Communication Corporation, Feb. 26, 2010, 3Gpp TSG SA WG2 Meeting #78.
"MTC Device Low Power Consumption and Device Triggering", Ericsson, ST-Ericsson, Feb. 26, 2010, 3GPP TSG SA WG2 Meeting #78.
"Two Solutions for Online Small Data Transmission", LG Electronics, Feb. 26, 2010, 3GPP TSG SA WG2 Meeting #78.
"3rd Generation Partnership Project; Technical Specification Group Services and System Aspects; Service Requirements for Machine-Type Communications (MTC); Stage 1 (Release 10)", Mar. 2010,3GPP TS 22.368.
"A Solution for Group Based Addressing", Huawei, May 2010, 3GOO TSG SA WG2 Meeting #79.
"Solution for Group Triggering of Attached MTC Devices", Huawei, Feb. 26, 2011, 3GPP TSG SA WG2 Meeting #83.
Extended European Search Report dated Mar. 6, 2013, issued in corresponding European Patent Application No. 11774385.6.

* cited by examiner

US 9,131,467 B2

METHOD FOR TRIGGERING COMMUNICATION BETWEEN GROUP OF MTC DEVICES AND MTC SERVER, AND MTC DEVICE

CROSS-REFERENCE TO RELATED APPLICATIONS

This application is a continuation of international Application No. PCT/CN2011/073350, filed on Apr. 27, 2011, which claims priority to Chinese Patent Application No. 201010168694.1, filed on Apr. 30, 2010, both of which are hereby incorporated by reference in their entireties.

FIELD OF THE INVENTION

The present invention relates to the field of communications technologies, and in particular, to a method for triggering communication between a group of MTC devices and an MTC server, and an MTC device.

BACKGROUND OF THE INVENTION

M2M (machine-to-machine, machine-to-machine communications) means that data is automatically transmitted from one terminal to another terminal without human involvement. In other words, M2M is a dialogue between machines, and M2M is also referred to as the Internet of things (Internet of Things).

In an M2M communication process, a large amount of M2M information is generated. Such information needs to be transmitted based on a communication system. That is, M2M is communication between machines, but still needs to be managed by a network side. An existing mobile communication network becomes a most popular and most promising technology for bearing and transmitting M2M information because no cable deployment is required and a coverage area is large. In addition, with a continuous increase of a mobile communication network bandwidth and increasing diversification of a terminal, a data service capability is improved continuously, which may further accelerate development of an M2M application.

In the future, M2M communication will be introduced to all industries, and for various different applications, mass terminals in trillions will be introduced at the same time. The introduction of such mass terminals raises a higher requirement on a management capability of a network side and increases a transmission load between a network and a terminal at the same time. To optimize the management capability of the network side and optimize signaling/data transmission between the network and the terminal, in a case where no data needs to be transmitted, only a signaling connection on a control plane may be maintained between the terminal and the network. In this case, the terminal can receive only an instruction delivered by the network side, but cannot transmit data on a service layer. In this way, when the terminal needs to transmit data on the service layer, it is required to "wake up" the terminal first. That is, a connection on a data plane is established for the terminal to trigger sending of data of the terminal. However, in an actual application, it may be necessary to trigger multiple terminals first to carry out a certain service. In this case, in the prior art, there is no corresponding solution about how to trigger multiple MTC devices.

For example, in M2M communication for a power system, to obtain electric meter readings of a community, all electric meters in the community need to be woken up to transmit data to an MTC server (Machine Type Communications Server, machine type communications server) of the power system. In this case, a problem of how to trigger sending data of these electric meters needs to be solved.

SUMMARY OF THE INVENTION

The present invention provides a method for triggering communication between a group of MTC devices and an MTC server, and an MTC device, thereby providing an implementation solution for triggering communication between a group of MTC devices and an MTC server.

The present invention provides the following solutions.

A method for triggering communication between a group of MTC devices and an MTC server includes:

receiving an MTC request message sent by a machine type communications MTC server, where the MTC request message carries a group ID of the group of MTC devices and a communication notification message for the group of MTC devices;

obtaining area information of the group of MTC devices; and sending the area information, the group ID of the group of MTC devices, and the communication notification message for the group of MTC devices to a cell broadcast center CBC, so that the CBC sends a broadcast message to a device in an area, where the broadcast message includes the group ID of the group of MTC devices and the communication notification message for the group of MTC devices.

A method for triggering communication between a group of MTC devices and an MTC server includes:

receiving an MTC request message sent by a machine type communications MTC server, where the MTC request message carries a group ID of the group of MTC devices and a communication notification message for the group of MTC devices;

obtaining area information of the group of MTC devices; and sending a broadcast message to a device in an area, where the broadcast message includes the group ID of the group of MTC devices and the communication notification message for the group of MTC devices.

A method for communicating with an MTC server includes:

receiving a broadcast message broadcast by a cell broadcast center CBC, where the broadcast message includes a group ID of a group of MTC devices and a communication notification message for the group of MTC devices; and communicating with an MTC server according to content in the broadcast message;

where the CBC obtains area information of the broadcast message and broadcasts the area information of the broadcast message in the following manner:

receiving an MTC request message that is sent by the MTC server and carries the group ID of the group of MTC devices and the communication notification message for the group of MTC devices; obtaining area information of the group of MTC devices; and initiating a cell broadcast request by using the area information; or receiving area information of an area where the group of MTC devices are located, the group ID of the group of MTC devices, and the communication notification message for the group of MTC devices, where the area information of the area where the group of MTC devices are located, the group ID of the group of MTC devices, and the communication notification message for the group of MTC devices are sent by an MTC gateway or an entity that has a proxy function, and initiating a cell broadcast request by using the area information, where the MTC gateway or the entity that has a proxy function obtains the area information in the following manner: receiving an MTC request message that is sent by the MTC server and carries the group ID of the group of MTC devices and the communication notification message for the group of MTC devices, and obtaining area information of the group of MTC devices.

An MTC device includes:

a receiving unit, configured to receive a broadcast message broadcast by a cell broadcast center CBC, where the broadcast message includes a group ID of a group of MTC devices and a communication notification message for the group of MTC devices; and a communicating unit, configured to communicate with an MTC server according to content in the broadcast message;

where the CBC obtains area information of the broadcast message and broadcasts the area information of the broadcast message in the following manner:

receiving an MTC request message that is sent by the MTC server and carries the group ID of the group of MTC devices and the communication notification message for the group of MTC devices; obtaining area information of the group of MTC devices; and initiating a cell broadcast request by using the area information; or receiving area information of an area where the group of MTC devices are located, the group ID of the group of MTC devices, and the communication notification message for the group of MTC devices, where the area information of the area where the group of MTC devices are located, the group ID of the group of MTC devices, and the communication notification message for the group of MTC devices are sent by an MTC gateway or an entity that has a proxy function, and initiating a cell broadcast request by using the area information, where the MTC gateway or the entity that has a proxy function obtains the area information in the following manner: receiving an MTC request message that is sent by the MTC server and carries the group ID of the group of MTC devices and the communication notification message for the group of MTC devices, and obtaining area information of the group of MTC devices.

According to the specific embodiments of the present invention, the present invention discloses the following technical effects.

In the present invention, an MTC request message that is sent by a machine type communications server and carries a group ID of a group of MTC devices and a communication notification message for the group of MTC devices are received; area information of an area where the group of MTC devices are located is obtained; and the area information, the group ID of the group of MTC devices, and the communication notification message for the group of MTC devices are sent to a cell broadcast center CBC, so that the CBC sends a broadcast message to a device in the area, where the broadcast message includes the group ID of the group of MTC devices and the communication notification message for the group of MTC devices, thereby implementing triggering of communication between a group of MTC devices and an MTC server.

BRIEF DESCRIPTION OF THE DRAWINGS

To describe the technical solutions in embodiments of the present invention or the prior art more clearly, the accompanying drawings required for the embodiments of are briefly introduced in the following. Evidently, the accompanying drawings illustrate only some embodiments of the present invention, and persons of ordinary skill in the art may also derive other drawings from these drawings without making creative efforts.

DETAILED DESCRIPTION OF THE EMBODIMENTS

The technical solutions in the embodiments of the present invention are described clearly and completely in the following with reference to the accompanying drawings in the embodiments of the present invention. Evidently, the embodiments to be described are only a part rather than all of the embodiments of the present invention. Based on the embodiments of the present invention, all other embodiments derived by those skilled in the art shall fall within the protection scope of the present invention.

In the embodiments of the present invention, multiple terminals may be triggered based on a CBS (Cell Broadcast service, cell broadcast service). The CBS means that information is sent in a broadcasting manner to all devices that are located in a certain area, where broadcast messages may be periodically received outside time for bidirectional communication. Generally, data such as stock market information, weather forecasts, and traffic reports provided by telecommunication operators is implemented by using the CBS because no special limit is set on recipients.

Figure 1:
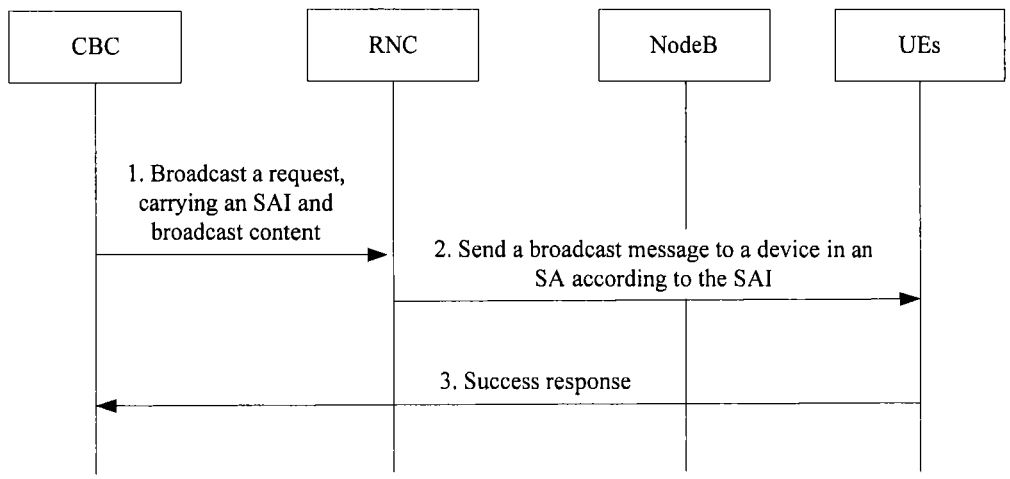
FIG. 1 is a CBS flowchart in a UMTS network.

A CBS procedure in a UMTS (Universal Mobile Telecommunications System, universal mobile telecommunications system) system is shown in FIG. 1. A CBC (Cell Broadcast Center, cell broadcast center) sends a Write-Replace message to an RNC (Radio Network Controller, radio network controller), where the Write-Replace message carries an SAI (Service Area Identity, service area identity) and/or a cell identity and/or a routing area identity RAI, and then the RNC (Radio Network Controller, radio network controller) broadcasts a message to a user in a specific area, an SA/RA/cell, according to the SAI and/or the cell identity and/or the RAI.

Figure 2:
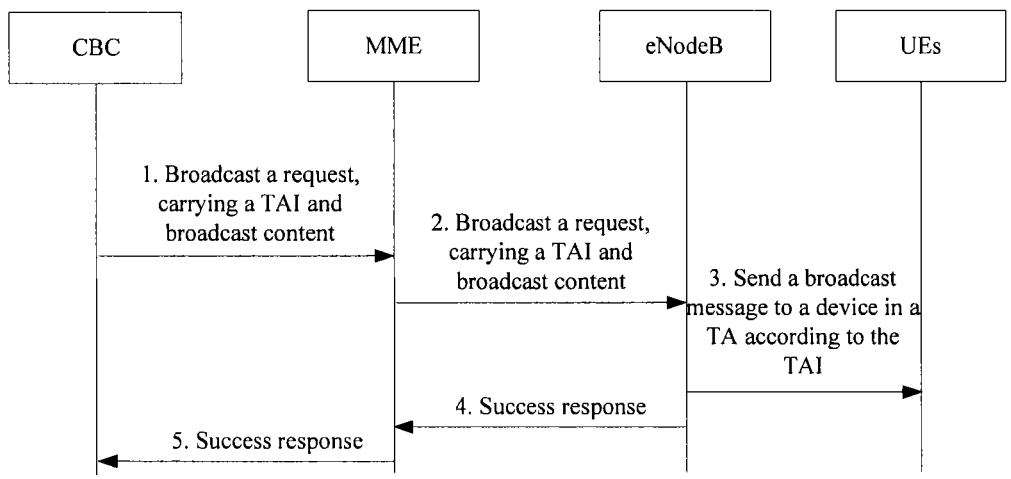
FIG. 2 is a CBS flowchart in an EPS network.

A specific procedure in an EPS (Evolved Packet System, evolved packet system) system, which is similar to that in the UMTS system, is shown in FIG. 2. A CBC sends a Write-Replace message to an MME (Mobility Management Entity, mobility management entity), where the Write-Replace message carries a tracking area identity TAI (Tracking Area Identity, tracking area identity)/a cell identity; the MME forwards the Write-Replace message to an eNB; and then the eNB broadcasts a message to a user in a specific area, a TA/cell, according to the TAI/the cell identity.

It can be seen that, a CBC needs to obtain a tracking area identity in advance, so that a specific Write-Replace message can be initiated to an RNC or eNB in an area. In a common mobile communication system, a network element or an application server inside a mobile communication network initiates a broadcast to a CBC, and the network element or the application server inside the network needs to obtain device area information in advance.

However, in the embodiments of the present invention, an MTC server initiates an MTC communication request. For a mobile communication network, the MTC server is equivalent to a network element of an external network, and the MTC server is only responsible for receiving data sent by an MTC device, regardless of a current location where the MTC device is located or whether the MTC device has mobility. Therefore, a key to solve a problem is how to enable the CBC to obtain its broadcast area information before sending a broadcast message. The embodiments of the present invention provide corresponding methods.

Embodiment 1

Figure 3:
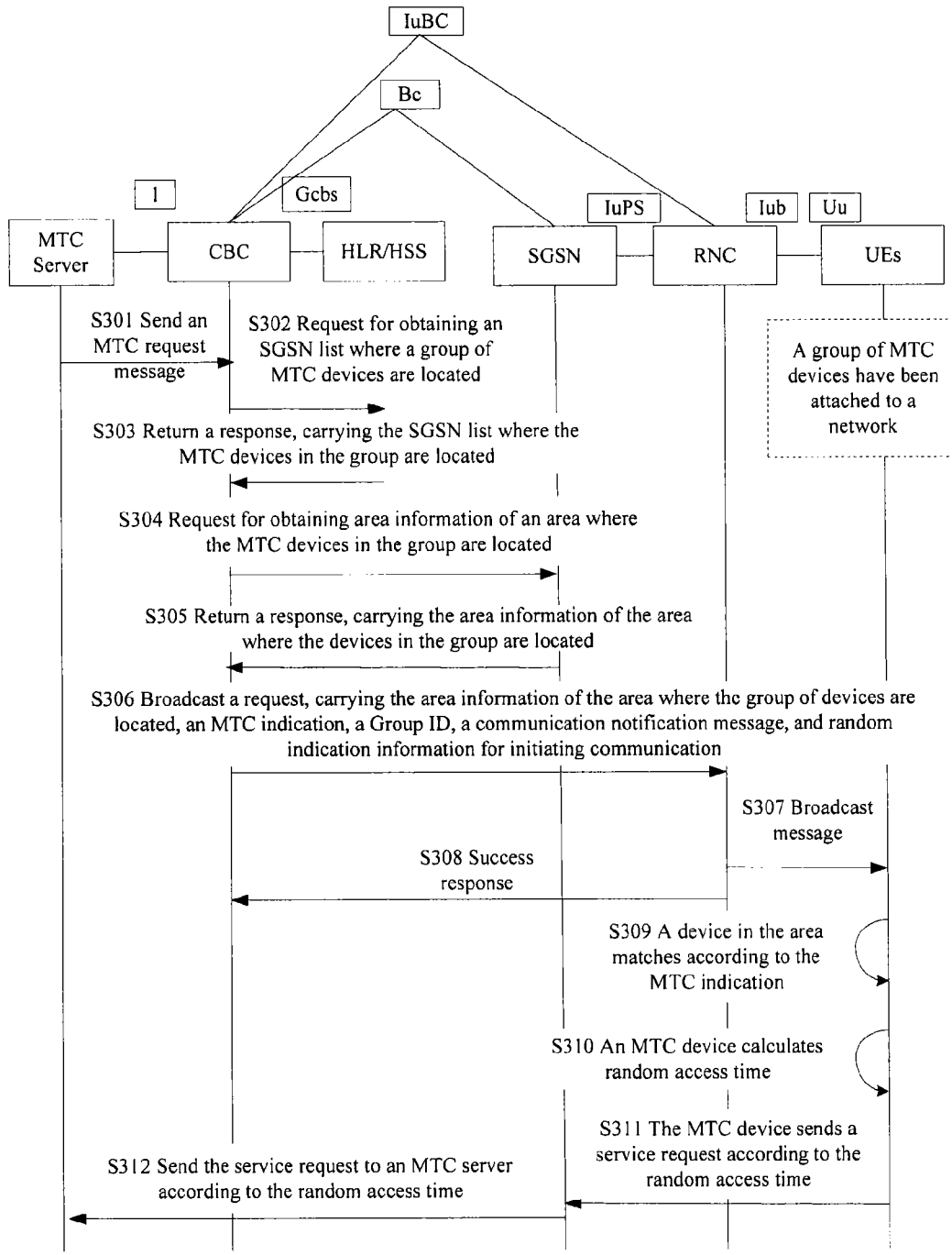
FIG. 3 is a flowchart of a first method according to an embodiment of the present invention.

In this embodiment, it is assumed that all MTC devices have been attached to a UMTS network. FIG. 3 shows interfaces between various network entities. In this solution, a Ccbs interface is newly added between a CBC and an HLR/HSS (Home Location Register/Home Subscriber Server, home location register/home subscriber server), and other interfaces are available by reusing existing network interfaces.

In a method provided in Embodiment 1 of the present invention, MTC devices are grouped first. For example, the MTC devices may be grouped according to different dimensions (for example, different area information, different applications, or different MTC owners). An ID (MTC Group ID) for uniquely identifying a group is set for each group. The MTC Group ID is stored in an MTC server, and at the same time, subscription information of each group and subscription information of each device included in each group are both stored in the HLR/HSS.

When initiating a wake-up request to the CBC, the MTC server may carry an ID of a group where a device that needs to be triggered is located. It should be noted that a Group ID of a group where a device is located does not necessarily represent area information of the device. That is, after obtaining the Group ID of the device, it is possible that the CBC may not directly initiate a broadcast message to trigger the device in the group. Therefore, area information of the device in the group needs to be obtained, so that broadcasting may be performed.

In a UMTS system, device area information is generally represented by an SAI (service area identity) or RAI (routing area identity) or a cell identity, where the SAI is formed by a PLMN (Public Land Mobile Network, public land mobile network) ID, an LAC (Location Area Code, location area code), and an SAC (Service Area Code, service area code). Before a message is broadcast, the CBC needs to obtain at least one of the following: an SAI list, a cell identity list, and an RAI list. The PLMN ID is related to a network element that initiates a request, and is relatively fixed. An SGSN (SERVING GPRS SUPPORT NODE, serving GPRS support node) may store an LAC and an SAC where a device is located. Both the cell identity and the RAI may be directly obtained form the SGSN. Therefore, the CBC needs to obtain an LAC and an SAC, or a cell identity list or RAI list of a device according to a group ID obtained from the MTC server.

In a network, multiple SGSNs exists, and only when a certain device is served by a certain SGSN, an LAC and an SAC of the device can be obtained from the SGSN. Therefore, which SGSN serves a device in a group needs to be obtained first. Generally, such information is recorded in an HLR/HSS. Therefore, before obtaining an LAC and an SAC from an SGSN, information of an SGSN where a device is located further needs to be obtained from an HLR/HSS, where the information of the SGSN may be one or multiple SGSN identities.

In other words, after receiving a trigger request sent by an MTC server, a CBC needs to first obtain, according to an MTC Group ID of a device, an SGSN list where the device is located, from an HLR/HSS, obtain one or multiple LACs or SACs of devices in a group from one or multiple SGSNs, then form an SAI of the device by using a PLMN ID, an LAC, and an SAC, and finally send an SAI list to an RNC; and the RNC initiates a broadcast to a specified area according to the SAI.

In the same way, after receiving a trigger request sent by an MTC server, a CBC needs to obtain, according to an MTC Group ID of a device, an SGSN list where the device is located, from an HLR/HSS, then obtain a cell identity list or an RAI list of a device in a group from one or multiple SGSNs, and finally send the cell identity list or the RAI list to an RNC, and the RNC initiates a broadcast to a specified area according to the cell identity list or the RAI list.

A procedure of the foregoing method is described in detail in the following. As shown in FIG. 3, the method includes the following steps.

S301: An MTC server sends an MTC request message (which may be a service request) to a CBC, where the MTC request message carries an MTC indication (an MTC flag bit, or an MTC identity, and so on), an MTC group ID, and trigger message content (that is, a Notification (notification message) for indicating that the type of the message is a trigger message). The request message may be sent by using a short message.

An MTC server sends an MTC request message to a CBC, where the MTC request message carries an MTC indication (an MTC flag bit, or an MTC identity, and so on), an MTC Group ID, and a communication notification message, and may further include MTC indication information, and random access indication for initiating communication. The request message may be sent by using a short message.

The MTC indication information is used to indicate that an MTC device in a specified area accepts a broadcast message sent by the CBC, and the MTC indication message may also be directly configured in the CBC (for example, MTC Message ID is directly configured in Message ID, that is, an FFFF field in Message Identifier is used to define a new service); or be negotiated in advance by an MTC network element (for example, an MTC GW or an MTC server) and the CBC. For example, relevant information of the MTC indication may be defined in Message ID and Message Type of the CBS, so that the MTC server or the MTC GW may send the MTC indication information to the CBC. Similarly, MTC indication information in Embodiments 2, 3, 4, 5, 6, 7, and 8 may also be configured by using the foregoing method.

The random access indication for initiating communication is used to indicate that an MTC device in a group obtains random access time according to the random access indication for initiating communication, and communicates with the MTC server within the random access time. A type of the MTC request message may be defined by using 0000100 or 0000101-1111111 in Warning Type. Similarly, MTC indication information in Embodiments 2, 3, 4, 5, 6, 7, and 8 may also be configured by using the foregoing method.

It should be noted that because an area indicated by one SAI may further include other non-MTC devices, such as H2H devices, when a trigger message is broadcast to the area indicated by the SAI, in addition to an MTC device, other non-MTC devices can also receive the broadcast message. However, it is obvious that for these H2H devices, the request message does not need to be accepted. If the H2H devices also receive the trigger message, they may perform certain processing, and finally find that the message is not required, thereby resulting in resource waste. Therefore, to avoid this case, in an exemplary embodiment of the present invention, when sending the MTC request message, the MTC server may also carry an MTC indication to indicate that the message is sent to an MTC device. When an H2H device receives a broadcast request message, if it is found that an MTC indication is carried, the H2H device may not need to accept the MTC request and may reject the request as soon as possible, thereby avoiding waste.

In addition, because the number of devices in a group may be very large, and when the devices are triggered simultaneously, if data is sent to the MTC server simultaneously, a block phenomenon may occur. For example, one group of an M2M system may include trillions of devices; after devices in the group receives a cell broadcast message, if the devices in the group simultaneously initiate a session request to a network, a network congestion problem may be caused after all devices in the group simultaneously access the network. To solve this problem, the MTC server may further carry random access indication for initiating communication when sending the MTC request message. In this way, after receiving the request, each device in the group may initiate a session request according to a specific algorithm and the random access indication, thereby avoiding congestion.

To facilitate the description, it is assumed that an MTC server carries an MTC indication and a random access indication in a sent MTC request message in Embodiment 1 and following embodiments.

The communication notification message, MTC indication information, and random access indication for initiating communication in the MTC request message may also be defined in CBS-Message-Information-Page n and CBS-Message-Information-Length n. CBS-Message-Information-Length n indicates a specific message length, and CBS-Message-Information-Page n carries a specific communication notification message, MTC indication information, and random access indication for initiating communication. Similarly, MTC indication information in Embodiments 2, 3, 4, 5, 6, 7, and 8 may also be configured by using the foregoing method.

S302: After receiving the request message, the CBC sends an Identification Request request to an HLR/HSS, where the request carries the MTC Group ID, to request for obtaining an SGSN list where devices in a group are located.

It should be noted that because the devices in the group may be served by multiple SGSNs, the CBC may obtain multiple SGSN identities from the HLR/HSS.

The request message may be transmitted by using MAP signaling. In a CBS protocol (23041), neither interface between the CBC and other network elements (except an RNC and an MME) nor their transmit signaling has been defined. In addition, because the HLR/HSS supports a MAP protocol, it only needs to enable the CBC to support the MAP protocol, so that MAP signaling may be used between the CBC and the HLR/HSS.

S303: The HLR/HSS returns an Identification Response to the CBC, where the response carries an SGSN list where MTC devices in the group are located.

S304: The CBC sends an Identification Request request message to an SGSN that serves the devices in the group, to request for obtaining an LAC list and an SAC list, or a cell identity list, or an RAI list, where the MTC devices in the group are located in the LAC list and the SAC list, or the cell identity list, or the RAI list. The request message uses the MAP protocol.

The request message between the CBC and the SGSN may be transmitted by using MAP signaling. Neither interface between the CBC and other network elements (except an RNC and an MME) or their transmit signaling has been defined. In addition, because the SGSN supports the MAP protocol, it only needs to enable the CBC to support the MAP protocol, so that MAP signaling may be used between the CBC and the SGSN.

S305: The SGSN returns an Identification Response to the CBC, where the response carries the LAC list and the SAC list, or the cell identity list, or the RAI list, where the devices in the group are located in the LAC list and the SAC list, or the cell identity list, or the RAI list.

It should be noted that devices served by one SGSN may be in different areas. Therefore, one SGSN may return multiple groups of combinations of LACs and SACs, and may also return multiple cell identities, or multiple RAIs.

S306: The CBC combines an LAC and an SAC that are returned by each SGSN into an SAI (SAI=PLMN ID+LAC+SAC), and sends a Write-Replace request message to an RNC, where the request message carries an SAI list or the cell identity list or the RAI list, where the devices in the group are located in the SAI list or the cell identity list or the RAI list, the MTC indication information, the MTC Group ID, the communication notification message, and the random access indication for initiating communication.

In the same way, for the cell identity list or the RAI list returned by the SGSN, the CBC sends a Write-Replace request message to the RNC, where the request message carries the cell identity list or the RAI list, where the devices in the group are located in the cell identity list or the RAI list, the MTC indication information, the MTC Group ID, the communication notification message, and the random access indication for initiating communication.

S307: The RNC sends an SMS Broadcast Command to all UEs in a specified area according to the received Write-Replace request message, where the message carries the MTC indication information, the MTC Group ID, the communication notification message, and the random access indication for initiating communication of the devices in the group.

S308: The RNC returns a success response to the CBC.

S309: After receiving the request, a device in the area first parses the request according to the MTC indication information; and if the device is an H2H device, refuse to accept the broadcast message; and if the device is an MTC device, accept the broadcast message, match a Search List stored internally with the MTC Group ID in the received message, and if matches, accept the request message, and if does not match, do not accept the request message.

S310: The MTC device accepts the request message, and at the same time, obtain, through calculation, specific content or random access time of a random access indication request for initiating communication.

S311 to S312: The MTC device sends a session request Session Request to the MTC server according to the random access time.

It can be seen that, in Embodiment 1, a CBC can obtain area information of a device, and then initiates a broadcast request to an RNC, thereby implementing triggering data sending of a group of MTC devices. Further, because an MTC indication and a random access indication for initiating communication are carried, a message processing overhead for a non-MTC device in an area is reduced, and network congestion may be avoided.

Embodiment 2

In Embodiment 1, a CBC obtains area information of a device according to a Group ID of the device. In Embodiment 2, to reduce enhancement for a CBC and avoid occupying excessive CBC resources, an independent network element (the network element has a function between an MTC server and an 3GPP interface, that is, Interworking Function, such as an MTC GW, an MTC server, or another entity that has a proxy function) may also be used to obtain area information of a device according to an MTC Group ID of the device; and then the network element sends the obtained area information of the device to a CBC; and the CBC may directly initiate a broadcast request to an RNC according to the area information of the device.

Figure 4:
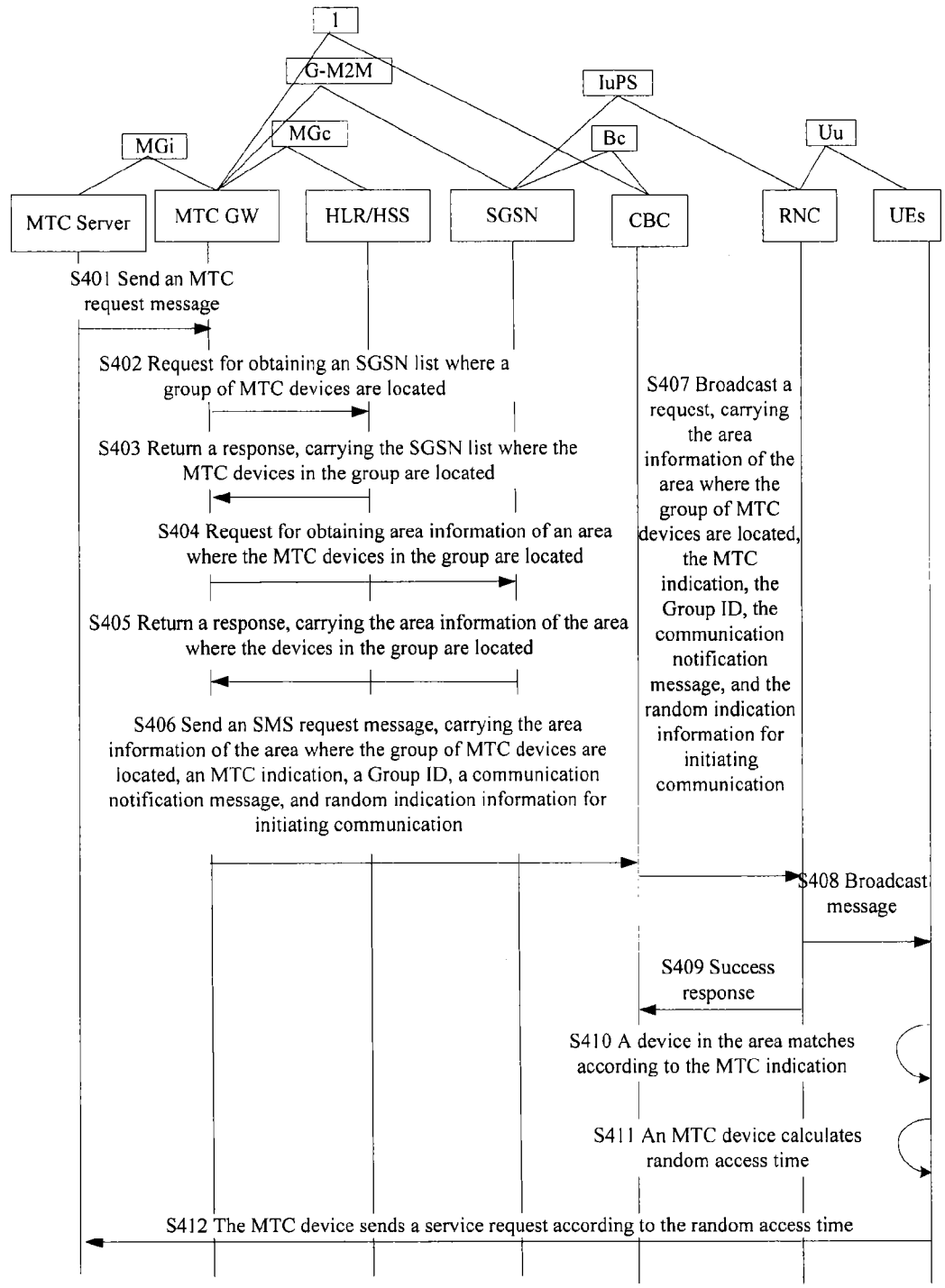
FIG. 4 is a flowchart of a second method according to an embodiment of the present invention.

As shown in FIG. 4, a prerequisite of Embodiment 2 is that all UEs are attached to a UMTS network. An MTC gateway (GW, GateWay) is added in the flowchart, and a module for obtaining an SGSN identity and an SAI identity is added to the MTC GW. At the same time, the flowchart shows interfaces between various network entities. That is, an interface MGi between an MTC server and the MTC GW, an interface MGc between the MTC GW and an HLR/HSS, and an interface G-M2M between the MTC GW and an MME are newly added; and other interfaces are available by reusing existing interfaces between network entities. Definitely, all functions of the MTC gateway may also be implemented by an MTC server.

A specific process includes:

S401: An MTC server sends an MTC request message to an MTC GW, where the request message carries MTC indication information, MTC Group ID, a communication notification message, and random access indication for initiating communication. The request message may be sent by using a short message.

S402: The MTC GW sends an Identification Request request message to an HLR/HSS, where the request carries a MTC Group ID, to request for obtaining an SGSN list to which group devices belong. The request message may use MAP signaling.

S403: The HLR/HSS returns an Identification Response response to the MTC GW, where the response carries an SGSN list to which all devices in the group belong.

S404: After receiving the SGSN identity to which group devices belong, the MTC GW sends an Identification Request request message to an SGSN, where the request message carries an MTC Group ID, to request for obtaining an SAC list and an LAC list, or a cell identity list, or an RAI list, where the devices in the group belong to the SAC list and the LAC list, or the cell identity list, or the RAI list. The request uses a Diameter protocol.

S405: The SGSN returns an Identification Response to the MTC GW, where the response carries the LAC list and the SAC list, or the cell identity list, or the RAI list, where the devices in the group belong to the LAC list and the SAC list, or the cell identity list, or the RAI list.

S406: The MTC GW sends an SMS request message to a CBC, where the request message carries the MTC indication information, the MTC Group ID, the communication notification message, the random access indication for initiating communication, and at the same time, carries at least one of the following: an SAI list, the cell identity list, and the RAI list, where SAI=PLMN-ID+SAC+LAC. The message may be sent by using a short message.

S407: The CBC sends a Write-Replace request message to an RNC, where the request message carries at least one of the following: the SAI list, the cell identity list, and the RAI list where the devices in the group are located, the MTC indication information, the MTC Group ID, the communication notification message, and the random access indication for initiating communication. The message supports a MAP protocol.

S408: The RNC sends an SMS Broadcast Command to all UEs in the SAI list, the cell identity list, or the RAI list, where the message carries the MTC indication information, the MTC Group ID, the communication notification information, and the random access indication for initiating communication.

S409: The RNC returns a success response to the CBC.

S410: After receiving the request, a device in an area first parses the request according to the MTC indication information; and if the device is an H2H device, refuse to accept a broadcast message; and if the device is an MTC device, accept the broadcast message, match a Search List stored internally with the MTC Group ID in the received message, and if matches, accept the request message, and if does not match, do not accept the request message.

S411: The MTC device accepts the request message and at the same time, obtains, through calculation, specific content and random access time of a trigger request.

S412: The MTC device creates a Session Request according to the random access time and sends data to the MTC server, where the MTC device may be one or multiple MTC devices in the group.

It can be seen that, in Embodiment 2, because a network entity MTC GW specially used for obtaining area information of a device is provided, a CBC may be allowed to only implement a basic operation, thereby avoiding occupying excessive CBC resources.

A newly added MTC GW is used to implement the following three functions:

(1) obtaining an SGSN identity to which devices in a group belong from an HLR/HSS, where the SGSN identity is indicated by a Group ID;

(2) obtaining an area identity SAI to which devices in a group belong from an SGSN, where the area identity SAI is indicated by a Group ID; and (3) sending a request message to a CBC, where the request message carries an MTC indication, an MTC Group ID, trigger message content, a random access indication for a device to access a network, and at the same time, carries an SAI list.

In Embodiment 2, all functions of the MTC GW may also be directly implemented by the MTC server.

Embodiment 3

Figure 5:
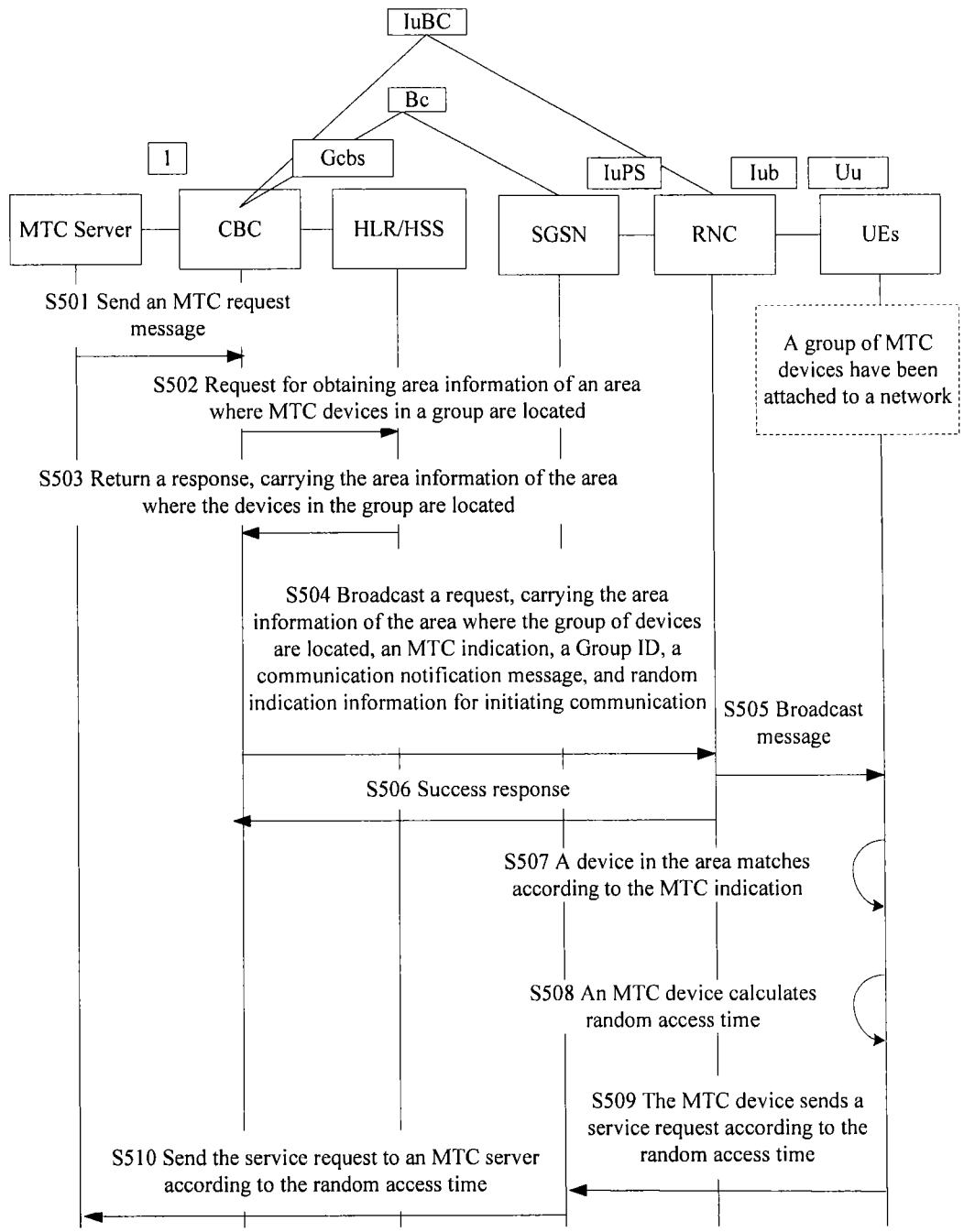
FIG. 5 is a flowchart of a third method according to an embodiment of the present invention.

Embodiment 1 and Embodiment 2 are described by using an example where an SAC, an LAC, a cell identity, or an RAI is saved on an SGSN. However, in an actual M2M application, for some low-mobility MTC devices (for example, an electric meter), an SAC and an LAC, a cell identity, or an RAI of a device is relatively fixed. Therefore, the SAC, LAC, cell identity, or RAI of the device may be directly saved in an HLR/HSS. That is, when a large number of low-mobility devices need to be woken up, an SAC list and an LAC list, or a cell identity list, or an RAI list of the devices may be directly obtained from the HLR/HSS. In this case, a corresponding procedure is simplified. Specifically, as shown in FIG. 5, the following steps are included.

S501: This step is the same as step S301 in Embodiment 1.

S502: A CBC sends an Identification Request to an HLR/HSS, to request for obtaining an SAC list and an LAC list, or a cell identity list, or an RAI list, where devices with a Group ID are located in the SAC list and the LAC list, or the cell identity list, or the RAI list.

S503: The HLR/HSS returns an Identification Response to the CBC, where the response carries the SAC list and the LAC list, or the cell identity list, or the RAI list.

S504 to S510: The steps are the same as steps S306 to S312 in Embodiment 1.

Embodiment 4

Figure 6:
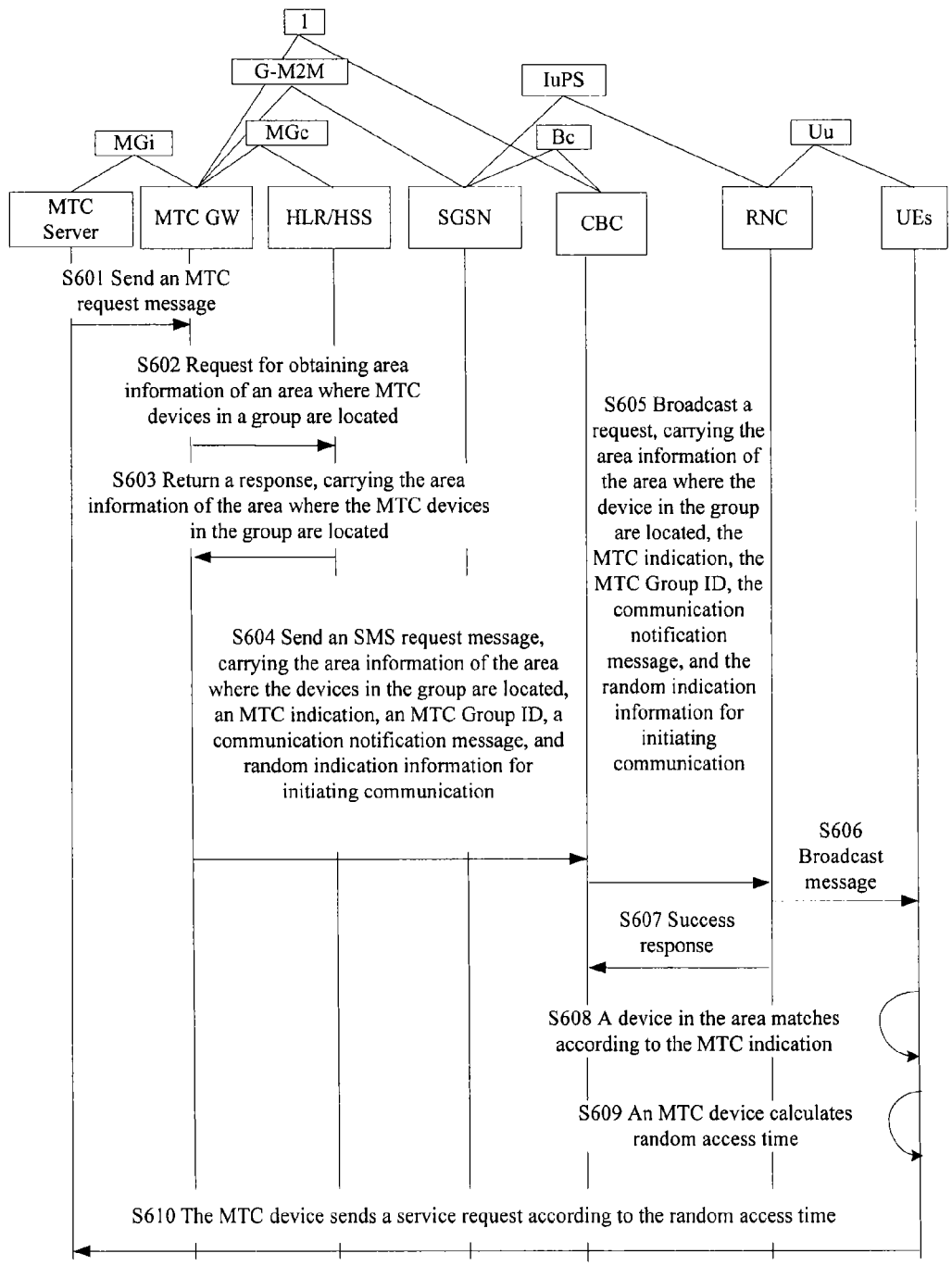
FIG. 6 is a flowchart of a fourth method according to an embodiment of the present invention.

A manner that is similar to that in Embodiment 2 may also be used in the case described in Embodiment 3. That is, an independent network entity MTC GW used for obtaining area information of a device is provided, then the area information of the device is sent to a CBC, and the CBC initiates a broadcast request to an RNC. All functions implemented by the MTC GW may be implemented by an MTC server. As shown in FIG. 6, a specific procedure includes:

S601: This step is the same as step S401 in Embodiment 2.

S602: An MTC GW sends an Identification Request to an HLR/HSS, to request for obtaining an SAC list and an LAC list, or a cell identity list, or an RAI list, where devices with a Group ID are located in the SAC list and the LAC list, or the cell identity list, or the RAI list.

S603: The HLR/HSS returns an Identification Response to the MTC GW, where the response carries the SAC list and the LAC list, or the cell identity list, or the RAI list.

S604 to S610: The steps are the same as steps S406 to S412 in Embodiment 2.

Embodiment 5

The foregoing embodiments are described by assuming that MTC devices are attached to a UMTS network. In an actual application, MTC devices may also be attached to an EPS network. A specific implementation method is similar to that in the UMTS network, but specific network entities involved and a detailed procedure are slightly different, which are described in the following.

Figure 7:
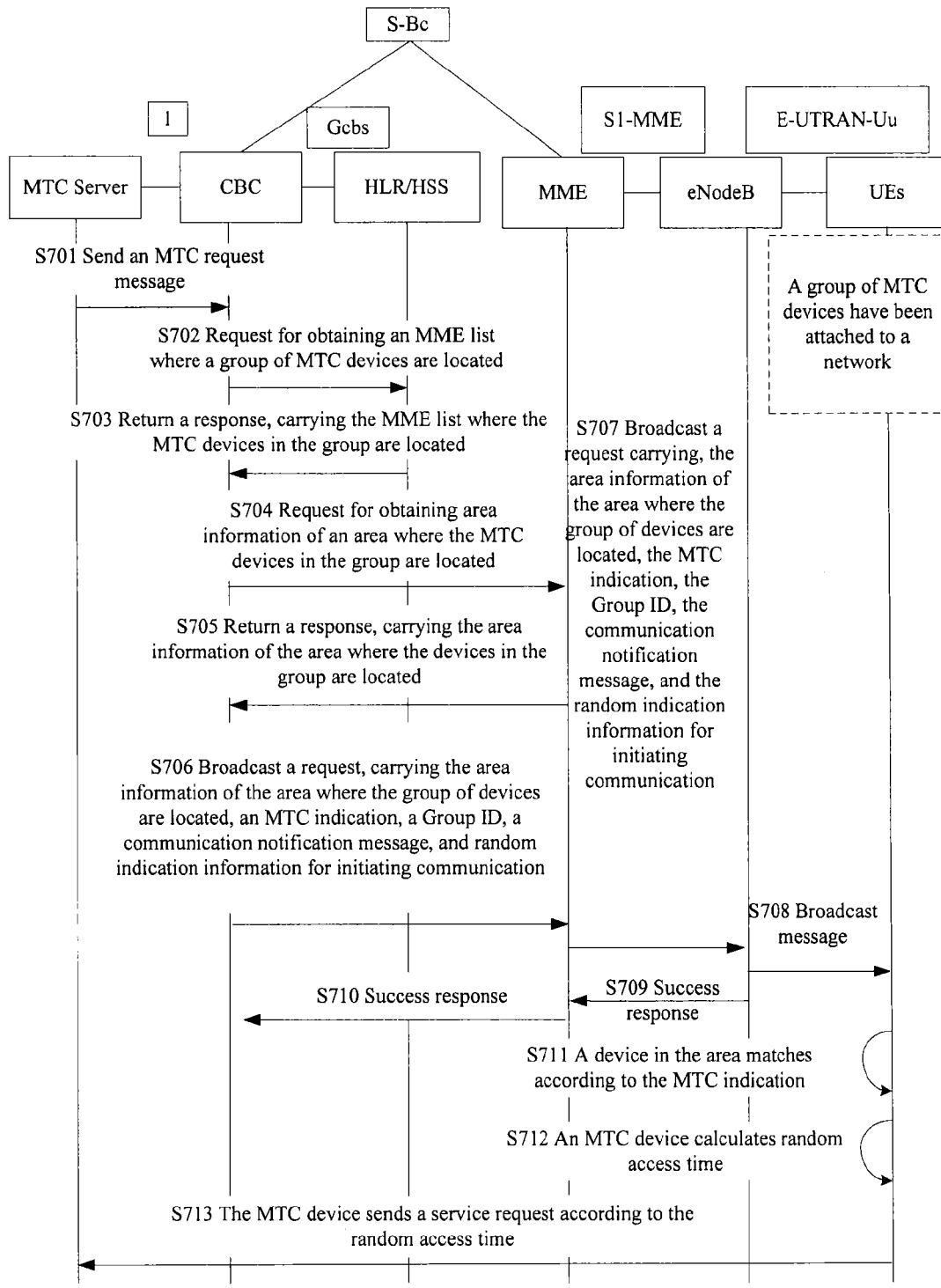
FIG. 7 is a flowchart of a fifth method according to an embodiment of the present invention.

As shown in FIG. 7, a method provided in Embodiment 5 includes the following steps.

First, a prerequisite of Embodiment 5 is that all MTC devices have been attached to an EPS network. FIG. 7 shows interfaces between various network entities. In this solution, a Ccbs interface is newly added between a CBC and an HLR, and other interfaces are available by reusing existing network interfaces.

S701: An MTC server sends an MTC request message to a CBC, where the MTC request message carries an MTC indication (an MTC flag bit, or an MTC identity, and so on), an MTC Group ID, and a communication notification message, and may further include MTC indication information and random access indication for initiating communication. The request message may be sent by using a short message.

The MTC indication information is used to indicate that an MTC device in a specified area accepts a broadcast message sent by the CBC, and the MTC indication message may also be directly configured in the CBC (for example, MTC Message ID is directly configured in Message ID, that is, an FFFF field in Message Identifier is used to define a new service); or be negotiated in advance by an MTC network element (for example, an MTC GW or an MTC server) and the CBC. For example, relevant information of the MTC indication may be defined in Message ID and Message Type of the CBS, so that the MTC server or the MTC GW may send the MTC indication information to the CBC. Similarly, MTC indication information in Embodiments 2, 3, 4, 5, 6, 7, and 8 may also be configured by using the foregoing method.

The random access indication for initiating communication is used to indicate that an MTC device in a group obtains random access time according to the random access indication for initiating communication, and communicates with the MTC server within the random access time. A type of the MTC request message may be defined by using 0000100 or 0000101-1111111 in Warning Type. Similarly, MTC indication information in Embodiments 2, 3, 4, 5, 6, 7, and 8 may also be configured by using the foregoing method.

It should be noted that because an area indicated by one SAI may further include other non-MTC devices, such as H2H devices, when a trigger message is broadcast to the area indicated by the SAI, in addition to an MTC device, other non-MTC devices can also receive the broadcast message. However, it is obvious that for these H2H devices, the request message does not need to be accepted. If the H2H devices also receive the trigger message, they may perform certain processing, and finally find that the message is not required, thereby resulting in resource waste. Therefore, to avoid this case, in an exemplary embodiment of the present invention, when sending the MTC request message, the MTC server may also carry an MTC indication to indicate that the message is sent to an MTC device. When an H2H device receives a broadcast request message, if it is found that an MTC indication is carried, the H2H device may not need to accept the MTC request and may reject the request as soon as possible, thereby avoiding waste.

In addition, because the number of devices in a group may be very large, and when the devices are triggered simultaneously, if data is sent to the MTC server simultaneously, a block phenomenon may occur. For example, one group of an M2M system may include trillions of devices; after devices in the group receives a cell broadcast message, if the devices in the group simultaneously initiate a session request to a network, a network congestion problem may be caused after all devices in the group simultaneously access the network. To solve this problem, the MTC server may further carry random access indication for initiating communication when sending the MTC request message. In this way, after receiving the request, each device in the group may initiate a session request according to a specific algorithm and the random access indication, thereby avoiding congestion.

To facilitate the description, it is assumed that an MTC server carries an MTC indication and a random access indication in a sent MTC request message in Embodiment 1 and following embodiments.

The communication notification message, MTC indication information, and random access indication for initiating communication in the MTC request message may also be defined in CBS-Message-Information-Page n and CBS-Message-Information-Length n. CBS-Message-Information-Length n indicates a specific message length, and CBS-Message-Information-Page n carries a specific communication notification message, MTC indication information, and random access indication for initiating communication. Similarly, MTC indication information in Embodiments 2, 3, 4, 5, 6, 7, and 8 may also be configured by using the foregoing method.

S702: After receiving the request message, the CBC sends an Identification Request request to an HLR/HSS, where the request carries the MTC Group ID, to request for obtaining an MME identity list where devices in a group are located. The devices in the group may be served by multiple MMEs; therefore, the CBC may obtain identities of multiple MMEs from the HLR/HSS.

The request message may be transmitted by using MAP signaling. In a CBS protocol (23041), neither interface between the CBC and other network elements (except an RNC and an MME) nor their transmission signaling has been defined. In addition, because the HLR/HSS supports a MAP protocol, it only needs to enable the CBC to support the MAP protocol, so that MAP signaling may be used between the CBC and the HLR/HSS.

S703: The HLR/HSS returns an Identification Response to the CBC, where the response carries the MME identity list where the devices in the group are located.

S704: The CBC sends an Identification Request request message to an MME that serves the devices in the group, to request for obtaining a TAI list or a cell identity list (for example, ECGI (E-UTRAN Cell Global Identity)), where the devices in the group are located in the TAI list or the cell identity list. The request message may be sent by using a SBc-AP protocol.

S705: The MME returns an Identification Response to the CBC, where the response carries the TAI list or the cell identity list, where the devices in the group are located in the TAI list or the cell identity list.

S706: The CBC sends a Write-Replace request message to the MME, where the request message carries the TAI list or the cell identity list, where the devices in the group are located in the TAI list or the cell identity list, the MTC indication information, the MTC Group ID, the communication notification message, and the random access indication for initiating communication.

In fact, broadcasting is finally performed by an eNodeB. However, a difference from that in a UMTS system is that, the CBC does not directly send the Write-Replace request message to a relevant eNodeB. The request message needs to be forwarded by the MME. The request message uses the SBc-AP protocol.

S707: The MME sends the Write-Replace request message to an eNodeB, where the request message carries the TAI list or the cell identity list, the MTC indication information, the MTC Group ID, the communication notification message, and the random access indication for initiating communication. The request message uses an S1-AP protocol.

S708: The eNodeB sends an SMS Broadcast Command to all UEs in an area specified by the TAI or the cell identity list, where the message carries the MTC indication information, the MTC Group ID, the communication notification message, and the random access indication for initiating communication.

S709: The eNodeB returns a Response-Success success response to the MME.

S710: The MME returns the Response-Success success response to the CBC.

S711: After receiving the request, a device in the area first parses the request according to the MTC indication information; and if the device is an H2H device, refuse to accept the broadcast message; and if the device is an MTC device, accept the broadcast message, match a search list stored internally with the MTC Group ID in the received message, and if matches, accept the request message, and if does not match, do not accept the request message.

S712: The MTC device accepts the request message and at the same time, obtains, through calculation, specific content and random access time of the trigger request.

S713: The MTC device sends a Session Request to the MTC server according to the random access time.

Embodiment 6

Being similar to Embodiment 2, in an EPS system, a network entity MTC GW specially used for obtaining area information of a device may also be provided.

Figure 8:
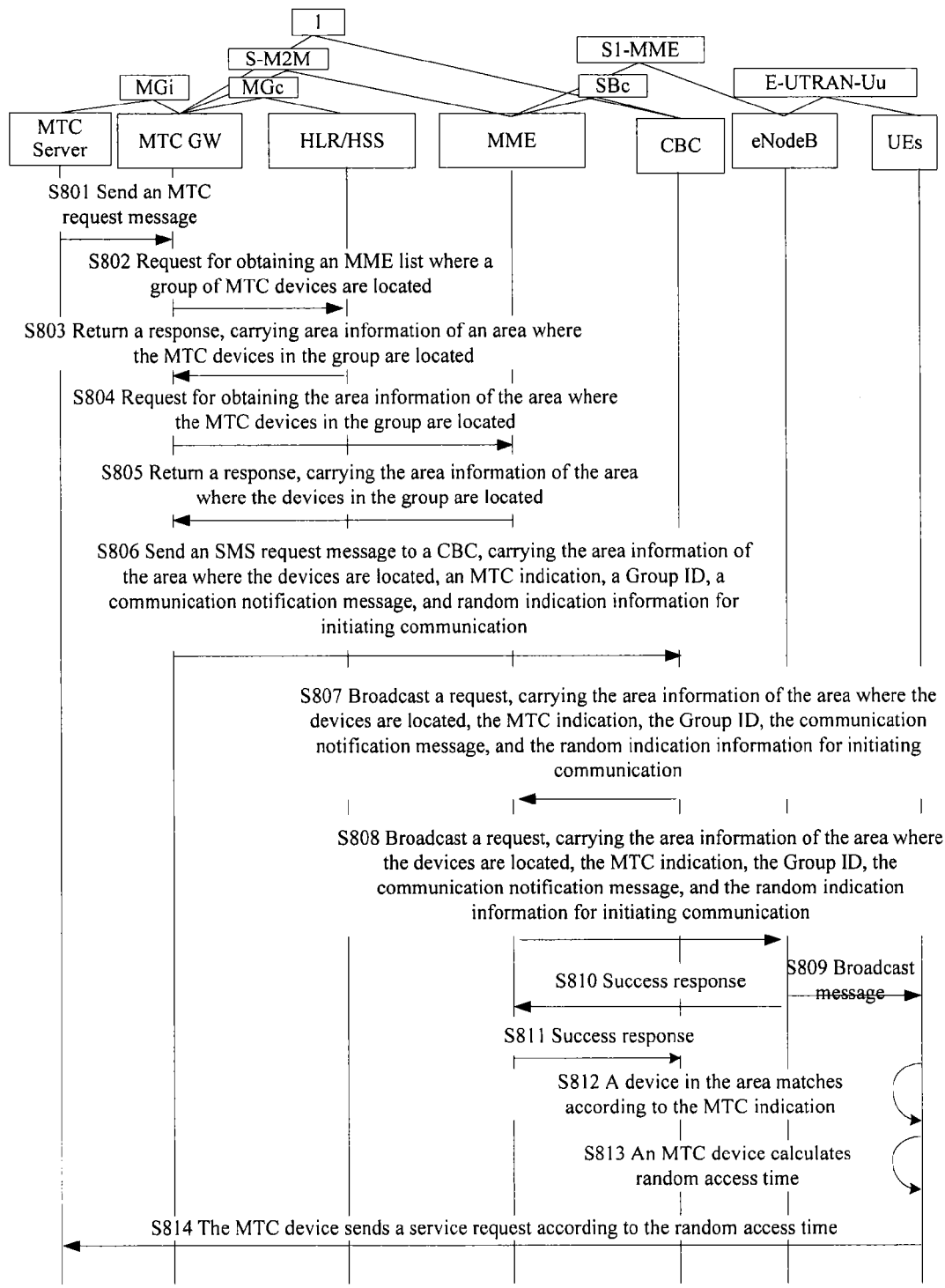
FIG. 8 is a flowchart of a sixth method according to an embodiment of the present invention.

As shown in FIG. 8, a prerequisite of this solution is that all UEs are attached to an EPS network. In FIG. 8, an MTC GW is added, and a module for obtaining an MME and TAI identity is added to the MTC GW. At the same time, the flowchart shows interfaces between various network entities, that is, an interface MGi between an MTC server and the MTC GW, an interface MGc between the MTC GW and an HLR/HSS, and an interface S-M2M between the MTC GW and the MME are newly added; and other interfaces are available by reusing existing interfaces between network entities. In the same way, in this embodiment, a function implemented by the MTC GW may be implemented by an MTC server.

S801: An MTC server sends an MTC request message to an MTC GW, where the request message carries MTC indication information, MTC Group ID, a communication notification message, and random access indication for initiating communication. The request message may be sent by using a short message.

S802: The MTC GW sends an Identification Request request message to an HLR/HSS, where the request carries the MTC Group ID, to request for obtaining an MME identity list to which devices in a group belong. The request message may use MAP signaling.

S803: The HLR/HSS returns an Identification Response response to the MTC GW, where the response carries an MME identity list to which all devices in the group belong.

S804: After receiving the MME identity to which the devices in the group belong, the MTC GW sends an Identification Request request message to the MME, where the request message carries the MTC Group ID, to request for obtaining a TAI list or a cell identity list, where the devices in the group belong to the TAI list or the cell identity list. The request uses a Diameter protocol.

S805: The MME returns an Identification Response to the MTC GW, where the response carries the TAI list or the cell identity list, where the devices in the group belong to the TAI list or the cell identity list.

S806: The MTC GW sends an SMS request message to a CBC, where the request message carries the MTC indication information, the MTC Group ID, the communication notification message, the random access indication for initiating communication, and at the same time, carries the TAI list or the cell identity list. The message may be sent by using a short message.

It can be seen that, a newly added MTC GW is used to implement the following three functions:

(1) obtaining an MME identity to which devices in a group belong from an HLR/HSS, where the MME identity is indicated by a Group ID;

(2) obtaining an area identity to which devices in a group belong from an MME, where the area identity is indicated by a Group ID; and (3) sending a request message to a CBC, where the request message carries MTC indication information, an MTC Group ID, a communication notification message, random access indication for initiating communication, and at the same time, carries a TAI list or a cell identity.

Steps S807 to S814 are the same as steps S706 to S713, and are not described again herein.

Embodiment 7

Figure 9:
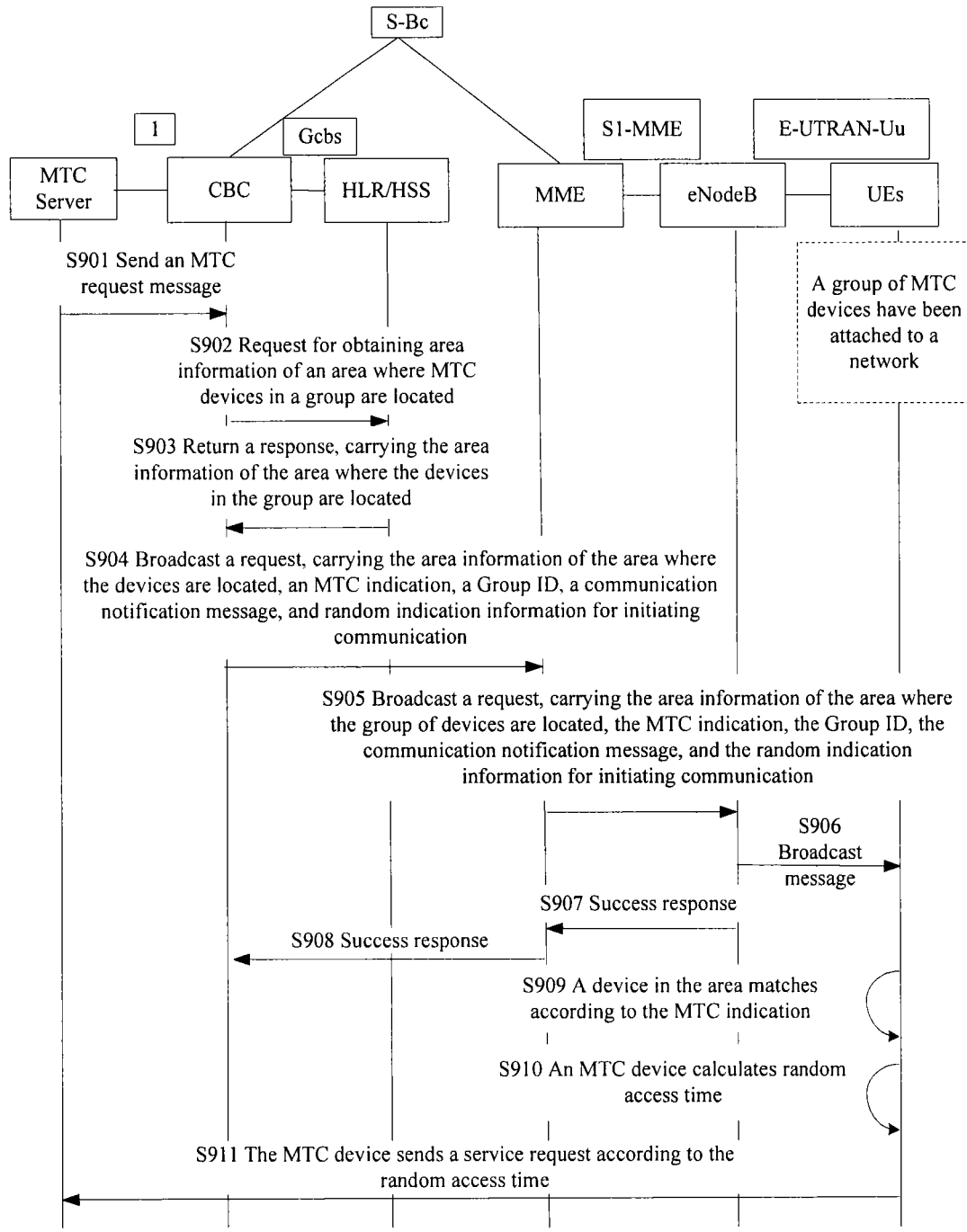
FIG. 9 is a flowchart of a seventh method according to an embodiment of the present invention.

Being similar to Embodiment 3, in an EPS system, a low-mobility device may also exist. In this case, area information TAI or a cell identity of a device is directly saved in an HLR/HSS. The TAI or the cell identity of the device is relatively fixed. Therefore, the TAI or the cell identity of the device may be directly saved in the HLR/HSS. That is, when a large number of low-mobility devices need to be woken up, TAI or a cell identity of devices may be directly obtained from the HLR/HSS, and does not need to be obtained through an MME. In this case, a corresponding procedure is simplified. Specifically, as shown in FIG. 9, the following steps are included.

S901: This step is the same as step S701 in Embodiment 5.

S902: A CBC sends an Identification Request to an HLR/HSS, to request for obtaining a TAI list or a cell identity list, where devices in a group are located in the TAI list or the cell identity list.

S903: The HLR/HSS returns an Identification Response to the CBC, where the response carries the TAI list or the cell identity list, where the devices in the group are located in the TAI list or the cell identity list.

S904 to S911: The steps are the same as steps S706 to S713 in Embodiment 5.

Embodiment 8

Figure 10:
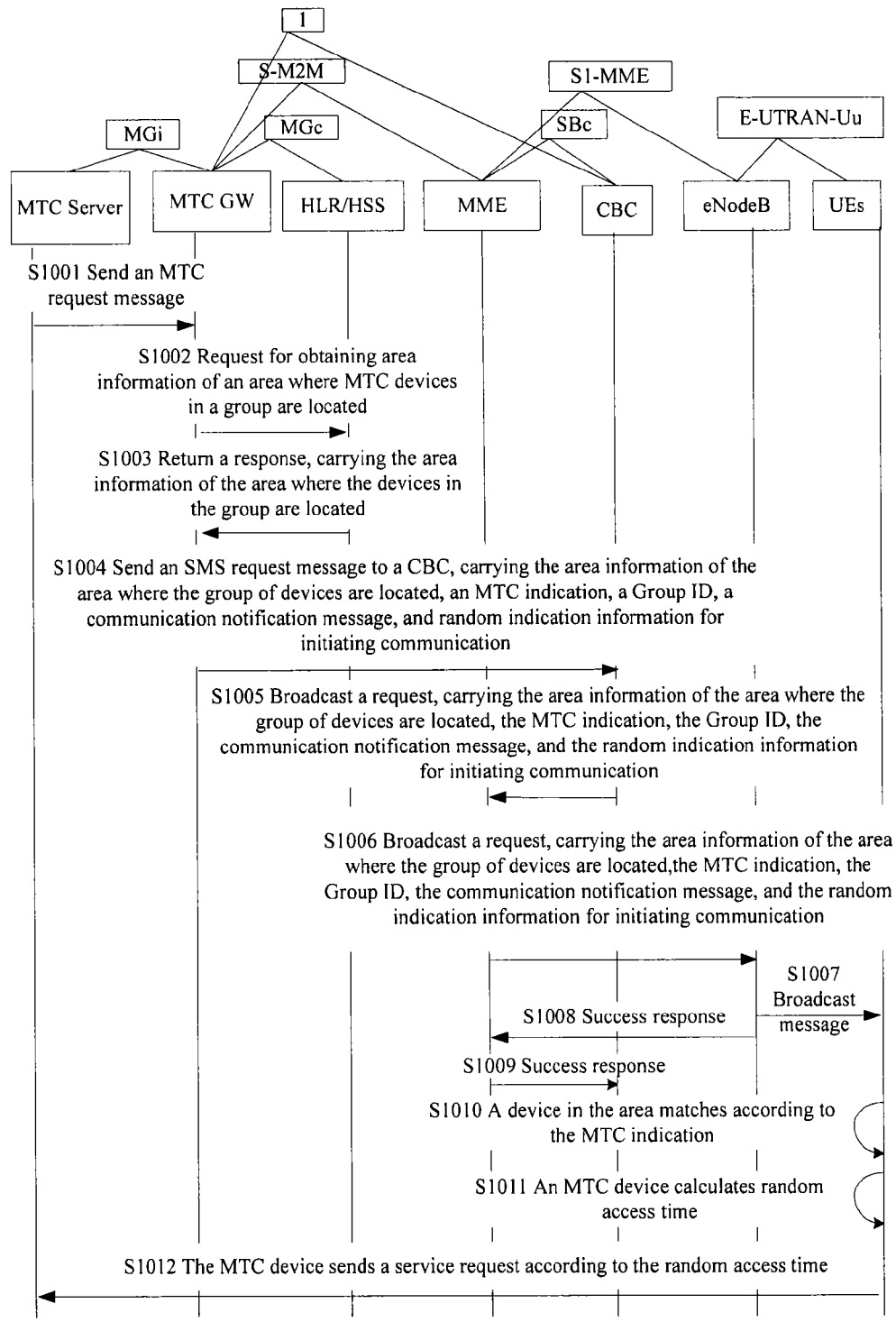
FIG. 10 is a flowchart of an eighth method according to an embodiment of the present invention.

In the same way, in the case described in Embodiment 7, a network entity MTC GW specially for obtaining area information of a device may also be provided to obtain area information of a device and send the area information to a CBC, and then the CBC initiates a broadcast request. As shown in FIG. 10, a specific procedure includes:

S1001: This step is the same as step S801 in Embodiment 6.

S1002: An MTC GW sends an Identification Request to an HLR/HSS, to request for obtaining a TAI list or a cell identity list, where devices with an MTC group ID are located in the TAI list or the cell identity list.

S1003: The HLR/HSS returns an Identification Response to the MTC GW, where the response carries the TAI list or the cell identity list, where the devices in the group are located in the TAI list or the cell identity list.

S1004 to S1012: The steps are the same as steps S806 to S814 in Embodiment 6.

Figure 11:
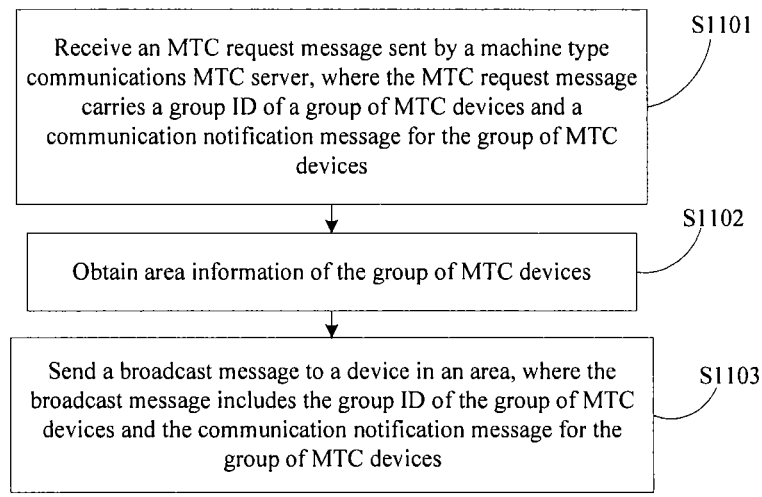
FIG. 11 is a flowchart of a ninth method according to an embodiment of the present invention.

In combination with the technical solutions provided in Embodiments 1, 3, 5, and 7, Referring to FIG. 11, a method for triggering communication between a group of MTC devices and an MTC server provided in an embodiment of the present invention includes the following steps.

S1101: Receive an MTC request message sent by a machine type communications MTC server, where the MTC request message carries a group ID of a group of MTC devices and a communication notification message for the group of MTC devices.

S1102: Obtain area information of the group of MTC devices.

S1103: Send a broadcast message to a device in an area, where the broadcast message includes the group ID of the group of MTC devices and the communication notification message for the group of MTC devices.

When the group of MTC devices are attached to a UMTS network, the obtaining, according to the ID of the group where the group of MTC devices are located, area information of an area where the MTC devices are located includes:

obtaining an SGSN list where the MTC devices are located from an HLR/HSS by using the ID of the group where the MTC devices are located; obtaining a location area code LAC list and a service area code SAC list, or a routing area identity RAI list, or a cell identity list from an SGSN that serves the MTC devices, where the MTC devices are located in the tracking area code LAC list and the service area code SAC list, or the routing area identity RAI list, or the cell identity list; and if the LAC list and the SAC list are obtained, combining a PLMN ID of the group of MTC devices and the obtained LAC list and SAC list into an SAI list of the area where the MTC devices are located; or obtaining at least one of the following: an SAI list, an RAI list, and a cell identity list of the area where the group of MTC devices are located from an HLR/HSS by using the group ID.

When the group of MTC devices are attached to an EPS network, the obtaining, according to the ID of the group where the group of MTC devices are located, area information of an area where the MTC devices are located includes:

obtaining an MME list (which may also be an SGSN) where the MTC devices are located from an HLR/HSS by using the ID of the group where the MTC devices are located; and obtaining a TAI list or a cell identity list from an MME that serves the MTC devices, where the MTC devices are located in the TAI list or the cell identity list, and using the TAI list or the cell identity list as the area information of the area where the MTC devices are located; or obtaining a TAI list or a cell identity list from an HLR/HSS by using the ID of the group where the MTC devices are located, where the MTC devices are located in the TAI list or the cell identity list, and using the TAI list or the cell identity list as the area information of the area where the MTC devices are located.

Similarly, the MTC request message may further carry MTC indication information. When the CBC initiates a broadcast request by using the area information, the MTC indication information is carried in the broadcast request, so that a device in the area determines, according to the MTC indication information, whether the request needs to be accepted, and thereby avoiding resource waste for an H2H device in the area.

The MTC request message may further carry random access indication for initiating communication, so that an MTC device in the area initiates a session request to a network according to the random access indication for initiating communication, thereby avoiding network congestion when the session request is initiated. Specifically, the MTC device may obtain random access time according to the random access indication for initiating communication, and communicate with the MTC server within the random access time.

Figure 12:
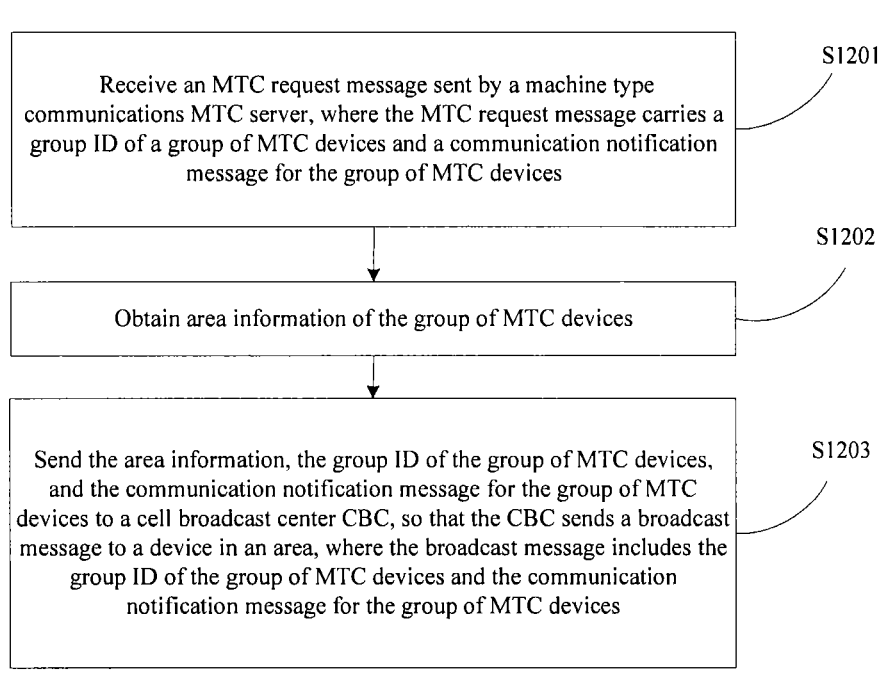
FIG. 12 is a flowchart of a tenth method according to an embodiment of the present invention.

In combination with the technical solutions provided in Embodiments 2, 4, 6, and 8, referring to FIG. 12, a method for triggering communication between a group of MTC devices and an MTC server provided in an embodiment of the present invention includes the following steps.

S1201: Receive an MTC request message sent by a machine type communications MTC server, where the MTC request message carries a group ID of a group of MTC devices and a communication notification message for the group of MTC devices.

S1202: Obtain area information of the group of MTC devices.

S1203: Send the area information, the group ID of the group of MTC devices, and the communication notification message for the group of MTC devices to a cell broadcast center CBC, so that the CBC sends a broadcast message to a device in an area, where the broadcast message includes the group ID of the group of MTC devices and the communication notification message for the group of MTC devices.

When the group of MTC devices are attached to a UMTS network, the obtaining, according to the ID of the group where the group of MTC devices are located, area information of an area where the MTC devices are located includes:

obtaining an SGSN list where the MTC devices are located from an HLR/HSS by using the ID of the group where the MTC devices are located; obtaining a tracking area code LAC list and a service area code SAC list, or a routing area identity RAI list, or a cell identity list from an SGSN that serves the MTC devices, where the MTC devices are located in the tracking area code LAC list and the service area code SAC list, or the routing area identity RAI list, or the cell identity list; and if the LAC list and the SAC list are obtained, combining a PLMN ID of the group of MTC devices and the obtained LAC list and SAC list into an SAI list of the area where the MTC devices are located; or obtaining at least one of the following: an SAI list, an RAI list, and a cell identity list of the area where the group of MTC devices are located from an HLR/HSS by using the group ID.

When the group of MTC devices are attached to an EPS network, the obtaining area information of an area where the group of MTC devices are located includes:

obtaining an MME list (which may also be an SGSN) where the MTC devices are located from an HLR/HSS by using the ID of the group where the MTC devices are located; and obtaining a TAI list or a cell identity list from an MME that serves the MTC devices, where the MTC devices are located in the TAI list or the cell identity list, and using the TAI list or the cell identity list as the area information of the area where the MTC devices are located; or obtaining a TAI list or a cell identity list from an HLR/HSS by using the ID of the group where the group of MTC devices are located, where the group of MTC devices are located in the TAI list or the cell identity list, and using the TAI list or the cell identity list as the area information of the area where the group of MTC devices are located.

Similarly, the MTC request message may further carry MTC indication information. When the CBC initiates a broadcast request by using the area information, the MTC indication information is carried in the broadcast request, so that a device in the area determines according to the MTC indication information, whether the request needs to be accepted, and thereby avoiding resource waste for an H2H device in the area.

The MTC request message may further carry random access indication for initiating communication, so that an MTC device in the area initiates a session request to a network according to the random access indication for initiating communication, thereby avoiding network congestion when the session request is initiated. Specifically, the MTC device may obtain random access time according to the random access indication for initiating communication, and communicate with the MTC server within the random access time.

Figure 13:
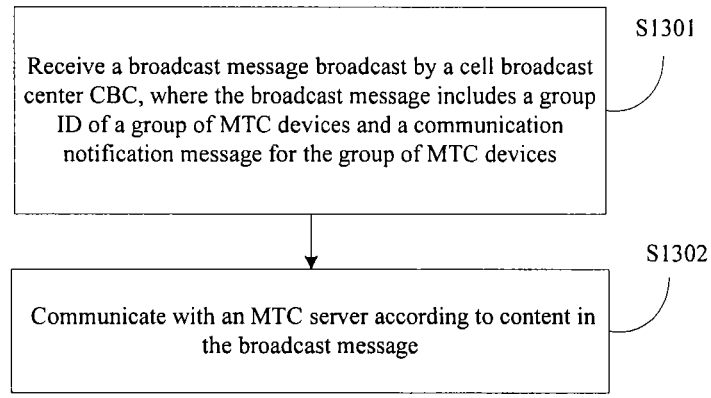
FIG. 13 is a flowchart of an eleventh method according to an embodiment of the present invention.

In combination with the foregoing embodiments, form the respective of an MTC device, an embodiment of the present invention further provides a method for communicating with an MTC server. Referring to FIG. 13, the method includes the following steps.

S1301: Receive a broadcast message broadcast by a cell broadcast center CBC, where the broadcast message includes a group ID of a group of MTC devices and a communication notification message for the group of MTC devices.

The CBC obtains area information of a broadcast request and broadcasts the area information of the broadcast request in the following manner: receiving an MTC request message that is sent by an MTC server and carries the group ID of the group of MTC devices and the communication notification message for the group of MTC devices; obtaining area information of the group of MTC devices; and initiating a cell broadcast request by using the area information; or receiving area information of an area where the group of MTC devices are located, the group ID of the group of MTC devices, and the communication notification message for the group of MTC devices, where the area information of the area where the group of MTC devices are located, the group ID of the group of MTC devices, and the communication notification message for the group of MTC devices are sent by an MTC gateway, and initiating a cell broadcast request by using the area information, where the MTC gateway obtains the area information in the following manner: receiving an MTC request message that is sent by the MTC server and carries the group ID of the group of MTC devices and the communication notification message for the group of MTC devices, and obtaining area information of the group of MTC devices.

S1302: Communicate with the MTC server according to content in the broadcast message.

The broadcast message further carries MTC indication information, and an MTC device accepts the broadcast request according to the MTC indication information and communicates with the MTC server.

The broadcast request may further carry random access indication for initiating communication, and the MTC device may obtain random access time according to the random access indication for initiating communication, and communicate with the MTC server within the random access time.

Figure 14:
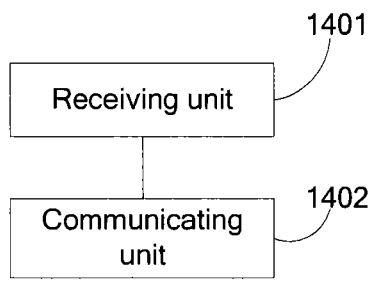
FIG. 14 is a schematic diagram of an MTC device according to an embodiment of the present invention.

Corresponding to the method for communicating with an MTC server provided in the embodiment of the present invention, an embodiment of the present invention further provides an MTC device. Referring to FIG. 14, the MTC device includes the following units:

a receiving unit 1401, configured to receive a broadcast message broadcast by a cell broadcast center CBC, where the broadcast message includes a group ID of a group of MTC devices and a communication notification message for the group of MTC devices; and a communicating unit 1402, configured to communicate with an MTC server according to content in the broadcast message;

where the CBC obtains area information of a broadcast request message and broadcasts the area information of the broadcast request message in the following manner: receiving an MTC request message that is sent by the MTC server and carries the group ID of the group of MTC devices and the communication notification message for the group of MTC devices; obtaining area information of the group of MTC devices; and initiating a cell broadcast request by using the area information; or receiving area information of an area where the group of MTC devices are located, the group ID of the group of MTC devices, and the communication notification message for the group of MTC devices, where the area information of the area where the group of MTC devices are located, the group ID of the group of MTC devices, and the communication notification message for the group of MTC devices are sent by an MTC gateway, and initiating a cell broadcast request by using the area information, where the MTC gateway obtains the area information in the following manner: receiving an MTC request message that is sent by the MTC server and carries the group ID of the group of MTC devices and the communication notification message for the group of MTC devices, and obtaining area information of the group of MTC devices.

Figure 15:
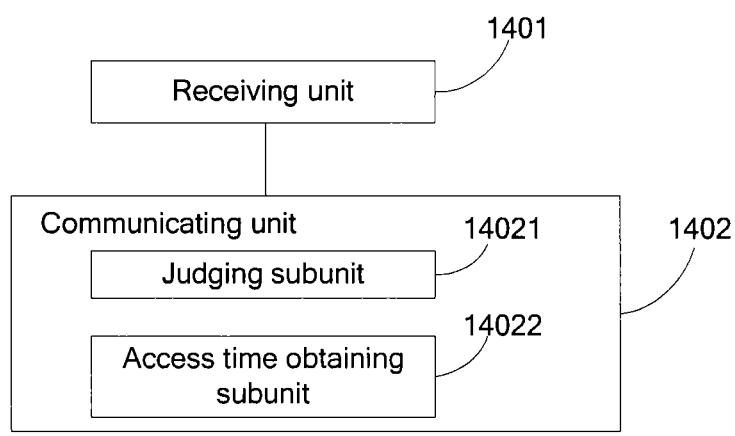
FIG. 15 is a schematic diagram of another MTC device according to an embodiment of the present invention.

Referring to FIG. 15, when the broadcast message further carries MTC indication information, the communicating unit 1402 includes:

a judging subunit 14021, configured to accept the broadcast request according to the MTC indication information, and then communicate with the MTC server.

When the broadcast message further carries random access indication for initiating communication, the communicating unit 1402 includes:

an access time obtaining unit 14022, configured to obtain random access time according to the random access indication for initiating communication, and communicate with the MTC server within the random access time.

It should be noted that all functions of an MTC GW involved in embodiments of the present invention may be implemented by an entity (for example, Proxy) that has a proxy function.

Persons of ordinary skill in the art may understand that all or part of the steps of the method according to the embodiments may be implemented by a program instructing relevant hardware. The program may be stored in a computer readable storage medium. The program includes the followings steps when being executed: receiving an MTC request message sent by a machine type communications MTC server, where the MTC request message carries a group ID of a group of MTC devices and a communication notification message for the group of MTC devices; obtaining area information of the group of MTC devices; and sending the area information, the group ID of the group of MTC devices, and the communication notification message for the group of MTC devices to a cell broadcast center CBC, so that the CBC sends a broadcast message to a device in an area, where the broadcast message includes the group ID of the group of MTC devices and the communication notification message for the group of MTC devices. The storage medium may be a ROM/RAM, magnetic disk, an optical disk, and so on.

The method for triggering communication between a group of MTC devices and an MTC server, and the MTC gateway device that are provided in the present invention are described in detail in the foregoing. The principle and implementation manner of the present invention are described by using specific examples in this specification. The foregoing embodiments are described to help understand the method and core ideas of the present invention. Meanwhile, variations may be made by persons of ordinary skill in the art based on the ideas of the present invention to the specific implementation manner and application scope. In conclusion, content of the specification shall not be understood as a limitation to the present invention.

The invention claimed is:

1. A method for triggering communication between a group of Machine Type Communications (MTC) devices and an MTC server, comprising:

receiving an MTC request message sent by a machine type communications MTC server, wherein the MTC request message carries a group ID of the group of MTC devices and a communication notification message for the group of MTC devices;

obtaining area information of the group of MTC devices; and sending the area information, the group ID of the group of MTC devices, and the communication notification message for the group of MTC devices to a cell broadcast center (CBC), so that the CBC sends a broadcast message to a device of the MTC devices in an area specified by the area information, wherein the broadcast message comprises the group ID of the group of MTC devices and the communication notification message for the group of MTC devices.

2. The method according to claim 1, wherein the obtaining area information of the group of MTC devices comprises:

obtaining a serving GPRS support node (SGSN) list and/or a mobility management entity (MME) list from a home location register/home subscriber server (HLR/HSS) by using the group ID, wherein the group of MTC devices are located in the SGSN list and/or the mobility management entity MME list; obtaining at least one of the following: a service area identity (SAI) list, a routing area identity (RAI) list, and a cell identity list of an area where the group of MTC devices are located from an SGSN in the SGSN list; and obtaining a tracking area identity (TAI) list and/or a cell identity list of the area where the group of MTC devices are located from an MME in the MME list; or obtaining at least one of the following: an SAI list, an RAI list, a TAI list, and a cell identity list of an area where the group of MTC devices are located from an HLR/HSS by using the group ID.

3. The method according to claim 2, wherein the obtaining the service area identity SAI list of the area where the group of MTC devices are located comprises:

obtaining a location area code (LAC) list and an SAC list of the area where the group of MTC devices are located, and forming the SAI list by using the LAC, the SAC and a public land mobile network (PLMN)-ID of the group of MTC devices.

4. The method according to claim 1, wherein the broadcast message further carries MTC indication information, wherein the MTC indication information is used to indicate that an MTC device in the area accepts the broadcast message.

5. The method according to claim 1, wherein the communication notification message further carries random access indication for initiating communication, wherein the random access indication for initiating communication is used to indicate that an MTC device in the group communicates with the MTC server according to the random access indication for initiating communication.

6. The method according to claim 5, wherein the MTC device in the group communicates with the MTC server according to the random access indication for initiating communication, which comprises:

obtaining, by the MTC device, random access time according to the random access indication for initiating communication, and communicating with the MTC server within the random access time.

7. The method according to claim 1, wherein the MTC request message sent by the MTC server is received by an MTC gateway or an entity that has a proxy function, and the MTC gateway or the entity that has a proxy function obtains the area information.

8. A method for triggering communication between a group of Machine Type Communications (MTC) devices and an MTC server, comprising:

receiving an MTC request message sent by a machine type communications MTC server, wherein the MTC request message carries a group ID of the group of MTC devices and a communication notification message for the group of MTC devices;

obtaining area information of the group of MTC devices; and sending a broadcast message to a device of the MTC devices in an area specified by the area information, wherein the broadcast message comprises the group ID of the group of MTC devices and the communication notification message for the group of MTC devices.

9. The method according to claim 8, wherein the obtaining area information of the group of MTC devices comprises:

obtaining a serving GPRS support node (SGSN) list and/or a mobility management entity (MME) list from a home location register/home subscriber server (HLR/HSS) by using the group ID, wherein the group of MTC devices are located in the SGSN list and/or the MME list; obtaining at least one of the following: a service area identity (SAI) list, a routing area identity (RAI) list, and a cell identity list of an area where the group of MTC devices are located from an SGSN in the SGSN list; and obtaining a tracking area identify (TAI) list and/or a cell identity list of the area where the group of MTC devices are located from an MME in the MME list; or obtaining at least one of the following: an SAI list and/or an RAI list, a TAI list, and a cell identity list of an area where the group of MTC devices are located from an HLR/HSS by using the group ID.

10. The method according to claim 9, wherein the obtaining the service area identity SAI list of the area where the group of MTC devices are located comprises:

obtaining a location area code (LAC) list and an SAC list of the area where the group of MTC devices are located, and forming the SAI by using the LAC, the SAC, and a public land mobile network (PLMN)-ID of the group of MTC devices.

11. The method according to claim 8, wherein the broadcast message further carries MTC indication information, wherein the MTC indication information is used to indicate that an MTC device in the area accepts the broadcast message.

12. The method according to claim 8, wherein the communication notification message further carries random access indication for initiating communication, wherein the random access indication for initiating communication is used to indicate that an MTC device in the group communicates with the MTC server according to the random access indication for initiating communication.

13. The method according to claim 12, wherein the MTC device in the group communicates with the MTC server according to the random access indication for initiating communication, which comprises:

obtaining, by the MTC device, random access time according to the random indication for initiating communication, and communicating with the MTC server within the random access time.

14. The method according to claim 8, wherein the MTC request message sent by the MTC server is received by a cell broadcast center (CBC), and the CBC obtains the area information.

15. A Machine Type Communications (MTC) device, comprising:

a receiving unit, configured to receive a broadcast message broadcast by a cell broadcast center (CBC), wherein the broadcast message comprises a group ID of a group of MTC devices including the MTC device, and a communication notification message for the group of MTC devices; and a communicating unit, configured to communicate with an MTC server according to content in the broadcast message;

wherein the CBC obtains area information of the broadcast message and broadcasts the area information of the broadcast message in the following manner:

receiving an MTC request message that is sent by the MTC server and carries the group ID of the group of MTC devices and the communication notification message for the group of MTC devices; obtaining area information of the area where the group of MTC devices are located; and initiating a cell broadcast request by using the area information; or receiving area information of an area where the group of MTC devices are located, the group ID of the group of MTC devices, and the communication notification message for the group of MTC devices, wherein the area information of the area where the group of MTC devices are located, the group ID of the group of MTC devices, and the communication notification message for the group of MTC devices are sent by an MTC gateway or an entity that has a proxy function, and initiating a cell broadcast request by using the area information, wherein the MTC gateway or the entity that has a proxy function obtains the area information in the following manner: receiving an MTC request message that is sent by the MTC server and carries the group ID of the group of MTC devices and the communication notification message for the group of MTC devices, and obtaining area information of the group of MTC devices.

16. The MTC device according to claim 15, wherein the communicating unit comprises at least one of following units:

a judging subunit, configured to, when the broadcast message further carries MTC indication information, accept the broadcast request according to the MTC indication information, and communicate with the MTC server; and an access time obtaining subunit, configured to, when the broadcast message further carries random access indication for initiating communication, obtain random access time according to the random access indication for initiating communication, and communicate with the MTC server within the random access time.

* * * * *